Figure 1:
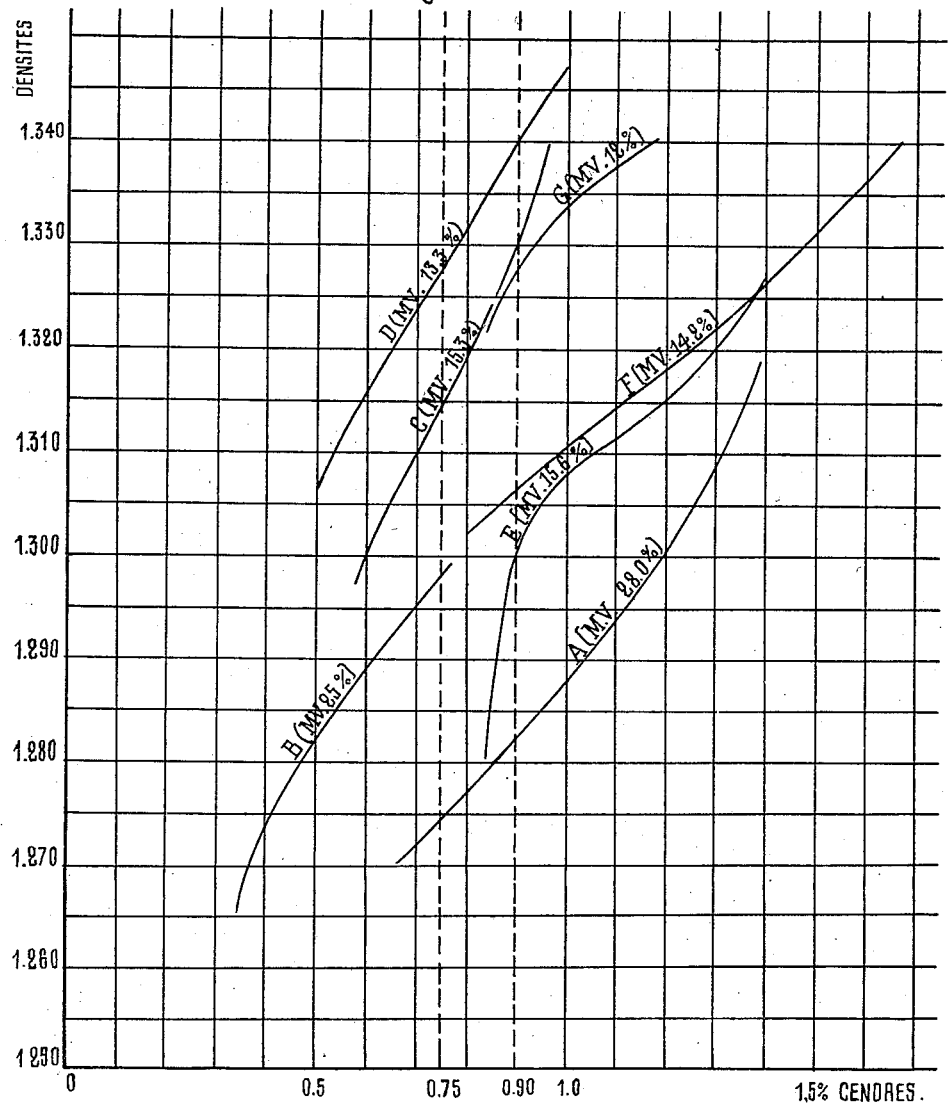

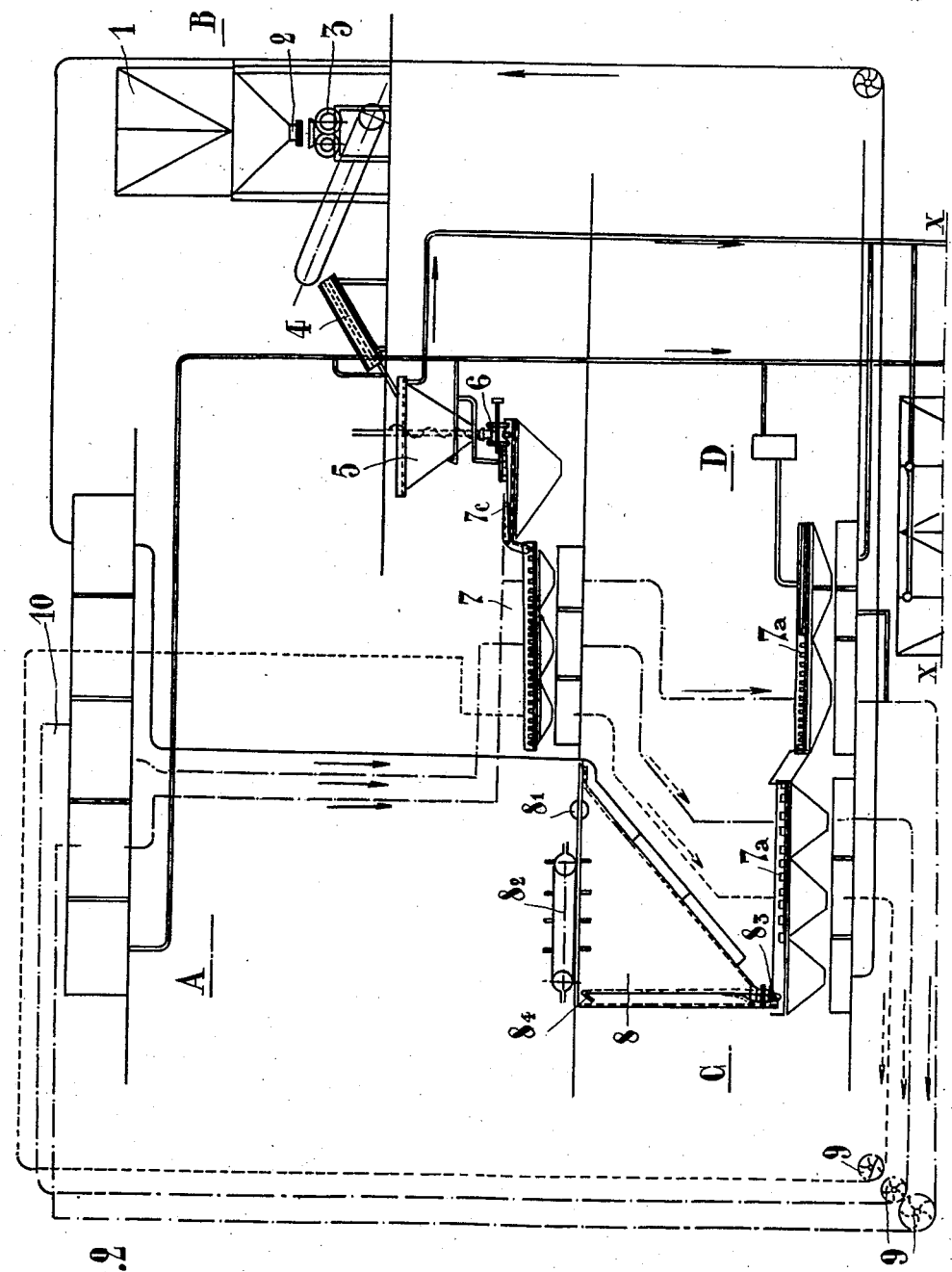

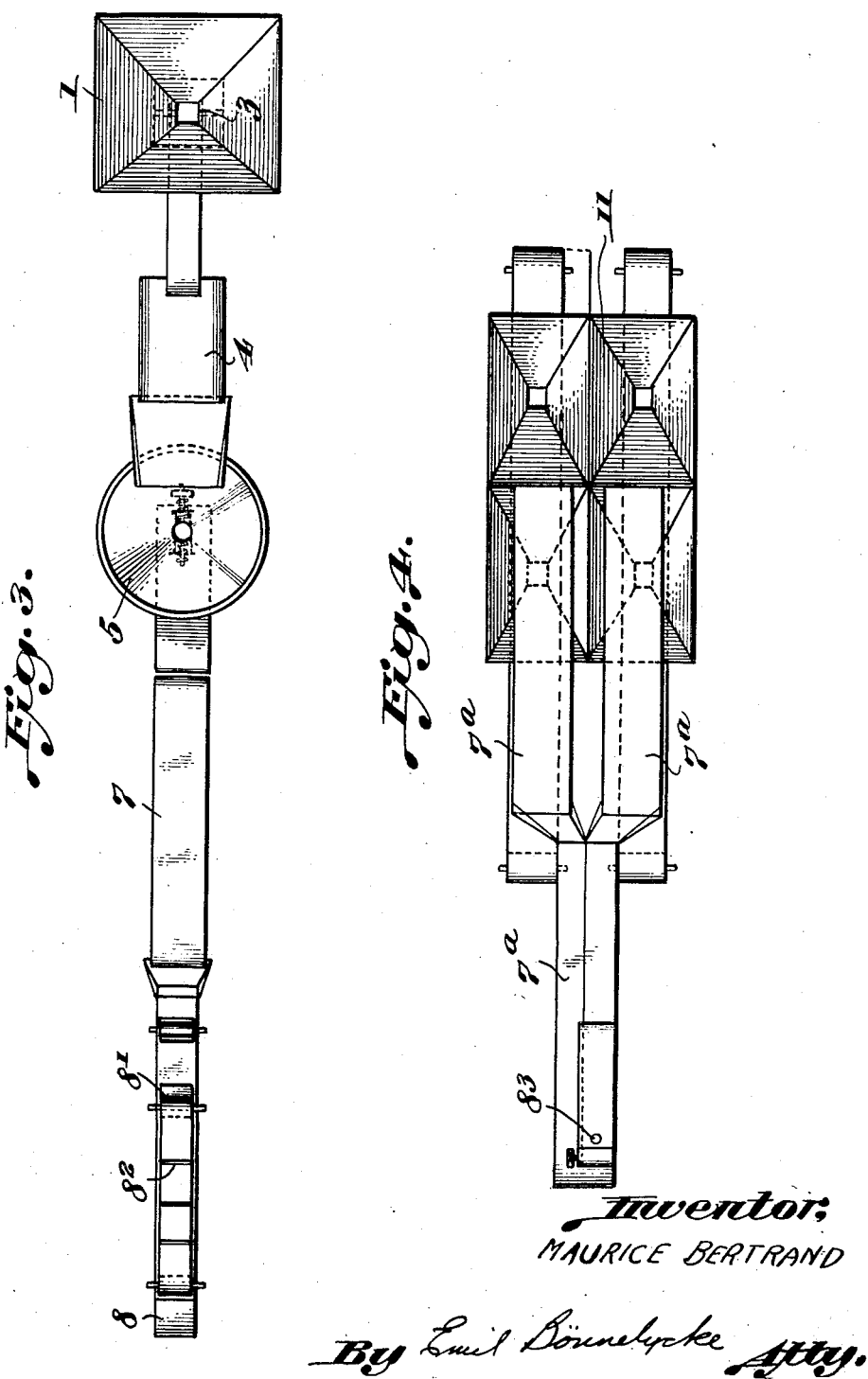

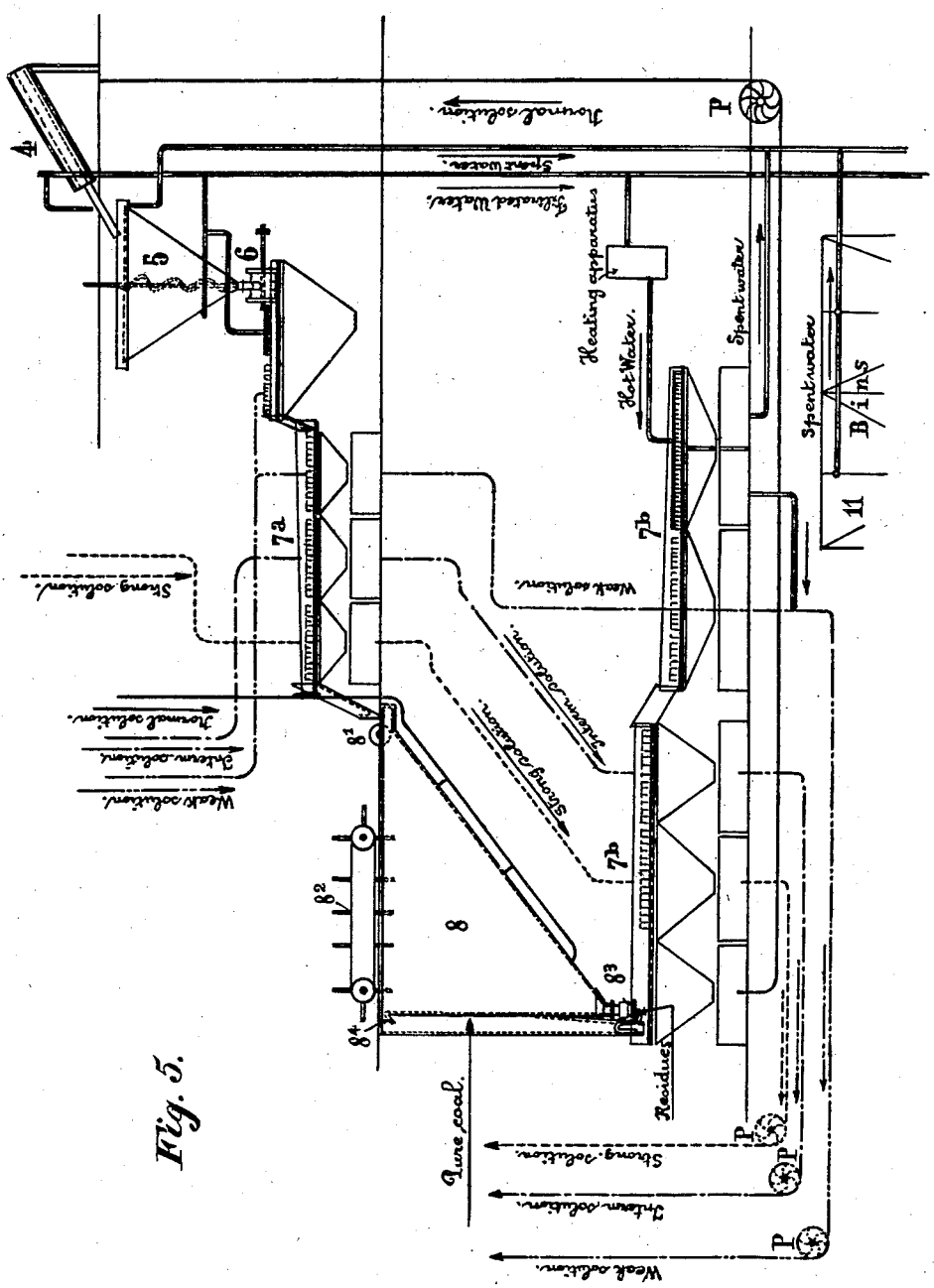

Patented Aug. 11, 1931

1,818,189

UNITED STATES PATENT OFFICE

MAURICE BERTRAND, OF ST. NICOLAS LEZ LIEGE, BELGIUM, ASSIGNOR TO SOCIETE ANONYME D'OUGREE MARIHAYE, OF OUGREE, BELGIUM

TREATMENT OR PURIFICATION OF COAL

Application filed November 21, 1927, Serial No. 234,892, and in France August 9, 1927.

This invention has reference to the treatment or purification of coal or other carbonaceous material in order chiefly to obtain therefrom a coal or like material of a superior quality and smaller ash-content.

Among the methods employed in laboratories to investigate by physical means the nature of coal, one of the oldest in the "Dense liquid method", in which, by taking a liquid of adequate density having no substantial chemical action on the product to be tested, waste or sterile schists are separated from the coal by flotation. In this way, various classes of coal, having different specific weights according to their ash content, can be separated. Zinc chloride is generally used for this purpose.

Thus, for instance, a pyritic Kentucky coal ("brazil") containing 19% ash and 6.36% sulphur will, on being placed in zinc chloride solution of 1.40 density, be separated into two layers, the upper one of which, amounting to 82.6% of the whole, now contains no more than 5.1% ash and 2.67% sulphur.

As a further example, a Belgian coal containing 23.5% ash will, in a 1.30 density zinc chloride solution, give 45.75% coal with 2.40% ash which floats on the liquid. The part remaining at the bottom of the vessel is then treated with a 1.9 density solution and will give 37% composites with 20.8% ash. There remains on the bottom of the apparatus 17.25% dross grading 80% ash. (Annals of the Mines of Belgium. XXII 4 1921 (J. de Caux) Pp. 1124–1125).

Coals containing from 4 to 5% ash have, however, hitherto been considered as practically pure.

I have carried my investigations into the unexplored zone of "pure coals", and have tested such coals by means of solutions of less densities than those generally used. I have thus ascertained that, with certain trade coals, coals of a very low ash content can be separated by a float-and-sink method, down to 0.3% ash. Washability curves have been drawn up as to these unexplored regions, and a study thereof has enabled me to ascertain that certain coals are, when suitably treated, capable of yielding very pure coals and, more especially, coals grading less than 2% ash, which are therefore of good industrial value.

As an example, I have shown, in Figure 1 of the accompanying drawings, a diagram of the characteristic curves of certain coals as a function of the density and the ash content. An examination of these curves shows that, in order to obtain one and the same ash content in the final products, the density of the liquid to be used depends particularly on the amount of volatile matters contained in the coal under treatment.

Fig. 2 is a side view, largely diagrammatic, of a form of apparatus or plant for carrying out the invention; Figs. 3 and 4 are horizontal sections, likewise diagrammatic in character, on lines A—B and C—D of Fig. 2; and Fig. 5 is an enlarged showing of a portion of Fig. 2.

Referring to Fig. 1, in order to obtain a coal containing 0.75% ash:

A coal A containing 28% volatile matter will require a liquid of 1.274 density.

A coal B containing 25% volatile matter will require a liquid of 1.298 density.

A coal C containing 15.3% volatile matter will require a liquid of 1.315 density.

A coal D containing 13.3% volatile matter will require a liquid of 1.328 density.

As a further example, I have found that, to obtain a coal having an ash content of 0.9%:

Coal A containing 28% volatile matter requires a liquid having a density of 1.282.

Coal B containing 15.6% volatile matter requires a liquid having a density of 1.302.

Coal F containing 14.2% volatile matter requires a liquid having a density of 1.304.

Coal G containing 12.0% volatile matter requires a liquid having a density of 1.328.

The density required in order to obtain a predetermined result is not solely a function of the volatile matter content, but is also governed by the nature and the amount of the ash entering into the constitution of the particular coal under consideration, i. e., whether the ash is purely the ingrained small particles of metallic residues or includes clays, schists or the like.

Various researches and tests which I have conducted have enabled me, by varying the conditions of the experiment, to separate any desired quality of coal, and in particuular, to obtain coal the ash percentage of which is below 1%, and which therefore, is suitable for various special uses. I can also obtain coals which, on being coked (either alone or mixed with suitable agglomerators), will permit a coke to be obtained containing less than 1% ash and particularly suited for the manufacture of electrodes.

In order to separate the very thin strata of coals of different ash-contents (which occur in more or less regular succession within coal seams, as is clearly shown by X-ray examination), the commercial coal is crushed—whatever the size thereof—and screened with the dust through a 10 mm. gauge screen, or any other smaller gauge according to the nature of the coal under treatment. After de-sliming, the coal is placed in a liquid of adequate density. The pure coal then rises or floats, and is collected separately from the residues which settle down on the bottom of the apparatus used.

Any suitable salt soluble in water, which is stable and of sufficient solubility and reasonable in cost, can be used for such a float-and-sink separation. The use of melted commercial calcium chloride (residual from the manufacture of certain chemicals) is, however, particularly suitable, allowing solutions to be obtained the density of which may reach 1.400 and which can yet be removed by washing from the coal obtained. This substance, moreover, introduces no new noxious element other than those already contained in the ash on which it, on the other hand, exerts an appreciable action as a chemical solvent.

My experiments show that when separating the closely similar grades of pure coal now in question, the float-and-sink process (which is in itself already known) has to be carried out under carefully regulated conditions having the purpose of maintaining its accuracy without, on the other hand, rendering it too slow to be industrially practicable. In particular, it is necessary to ensure the constancy of the density of the liquid after immersion therein of coal which is already wet. In this conection, although I prefer to use wet coal, since separation by water is the most convenient way of separating the dust from the coal to be treated, yet it is desirable according to the invention to start with coal which is wet with water in order to prevent the attachment of air bubbles to the particles, which bubbles serve to buoy up, during the grading process, grains that, according to the density of the liquid, would otherwise sink. On the other hand, it might be thought possible to initially wet the coal with a solution similar to the separating solution, but owing to its viscosity this solution would not flow freely over the particles and the process would take too long and still be liable to leave attached air bubbles to vitiate the accuracy of the separation process.

Accordingly, the invention consists primarily in a process for preparing grades of coal for separation according to specific gravity in which the coal is first wetted and then impregnated in succession with a series of liquids (of a like kind to the separating liquid) of increasing strength, so that its final immersion in the separating liquid will not cause the dilution of the latter more than a negligible amount which can be easily dealt with.

I here observe that it has already been proposed to subject coal to liquids decreasing in strength after the separation process in order to recover the salt therefrom.

The present invention further comprises the utilization of the liquids drained from the impregnation treatments as desalting liquids, the densities however being arranged in a reverse order. Thus, for example, where three liquids are used, the intermediate impregnating liquid becomes diluted from the weaker liquid with which the coal was wetted; but when utilized after separation, has its strength restored from the stronger liquid adhering to the coal from the previous washing process. It is thus possible to arrange streams of liquid in closed cycles which will work satisfactorily for continuous periods with little attention, without substantial alteration in their strength.

It is a further important part of the process that the particles shall be of such size as to pass through a 10 mm. screen but shall not include dust that will pass through a .5 mm. screen. It is necessary to have small particles, since different grades of ash content within the ranges desired to be separated may be found together in larger pieces, and in any case the result obtained by the process would probably not be sufficiently standardized to produce a coal which could be used, for example, in the production of a coke for making electrodes. On the other hand, it is necessary to separate the final dust, owing to the protracted period of time required to treat this material in a process of wet separation.

As will be apparent from Figs. 2, 3 and 4, the materials employed, fed from hopper 1 and distributed by the device 2, pass through a crusher 3 to reduce them to grains or pieces less than 10 mm. in diameter. After having been de-slimed by dry or wet screening at 4, or by winnowing or any other suitable commercial method, the grains so obtained are washed in a conical container or hopper 5 in order to complete the de-sliming or cleaning. The grains or pieces are then regularly fed by a rotary distributor 6 to a device by which they are impregnated successively with one or more (three, for example) solutions of increasing strength of calcium chloride or other salt of which the actual separating solution is made, the strength of the impregnating solutions being intermediate between 1 and the density required to effect separation. Previous to and after each of said impregnating treatments, a draining or de-watering stage is allowed in order to remove from the grains most of the liquid with which they have been wetted, the first draining device being indicated at 7c. In the form shown, the impregnating device comprises a shaking conveyor or frame 7 extending over three separate drainage funnels over which the liquids are dropped in the form of fine rain from sprinklers arranged at the forward sides of the funnels so that time is allowed for the surplus liquid to drain off before the coal passes over to the next funnel and sprinkler. Alternatively, I may employ rotary or plain filters, or hydro-extractors or any other device adapted to give the material a thorough wetting and allow for drainage of surplus at each stage.

After draining the third solution—in the case where there are three intermediate solutions—the grains are led to a separating apparatus 8, which comprises a wooden, metal or concrete trough provided with a protective coating of suitable impervious material and filled with the so-called standard or normal solution of soluble salt, usually calcium choride, which remains or is kept (by suitable additions) at the density adequate to obtain in the floating product, as desired, an ash content of, say, below 2% or even below 1%. Immersion is ensured by a mechanical stirrer $8^1$, after which the grains that float become separated and travel to the surface, moving to the left with the current flowing from the inlet to the outlet of the apparatus and also because of the action of scraper blades $8^2$ (if used). The grains, which are denser than the solution, sink therein and settle on the bottom of the apparatus. The pure coal is discharged by means of, say, the blades or paddles $8^2$ which force it over the sill of the weir $8^4$, while the residues are removed in a constant or intermittent manner through a siphon $8^3$ adjustable by means of a cock and delivery-regulating nozzle, or through any other means using a static or mechanical discharge device with a constant or with an intermittent delivery.

The so-obtained pure and residual coals are taken up by draining apparatus similar to those above described, and then are passed again through the three solutions which they have traversed before entering the separator, but in the decreasing order of densities. Passage through each solution is preceded and followed by a draining on shaking conveyors 7a, or in filters or in hydro-extractors or any other suitable devices or contrivances as before. These operations may be carried out in a series of apparatus or successively in one and the same apparatus, several apparatus being in that case arranged in parallel to ensure continuity of operations.

The purposes of these passages through intermediate solutions is firstly to prepare the coal and to prevent, to some extent, the so-called normal or standard solution from being diluted by the de-sliming water and the diluted liquids that moisten the pieces of coal. The first solution, the density of which is low (say, 1.050) displace the rinsing water; the second solution or so-called medium solution which has a density of, say, 1.180, displaces the first one; and the third solution or so-called strong solution of, say, 1.250 density, displaces the second one. In displacing the weaker ones, the solutions become impoverished, but the coal brought to the separator after the third one is soaked with a solution the density of which is very close to that of the separating solution, and, therefore, said separating solution can readily enough be kept constant by adding thereto small quantities of concentrated solutions calculated to compensate for the loss in density due to the addition of the solution adhering to the coal issuing from the third intermediate solution.

The weakened solutions pass again over the coal issuing from the separator, but pass thereover in the reverse order as to densities. Since the solutions then impinge on coals soaked with more concentrated solutions, they become enriched, recovering substantially their initial density. It thus becomes practical to arrange for said solutions to circulate through closed circuits, being taken up by pumps 9 or acid lifts and returned to the upper part 10 of the plant, whence they will flow down by gravity for a new cycle. Their densities and their volumes remain substantially constant and the slight adjustments or corrections required over a continuous period are easily made.

On issuing from the weakest solution, the grains or pieces of coal are passed through clear water (either filtered or not, and either hot or cold) and are next allowed to drain by any usual means as hereinbefore described. The first part of such draining waters may, if desired, be collected and mixed with the weakest solution, the volume of which then goes on increasing. The surplus may be returned to the draining table 7c in order to begin the soaking of the coals to be treated and to eliminate part of the de-sliming water.

My means of the foregoing systematic washing method, it has been possible to reduce the expenditure of soluble salt lost in the two last washings, an expenditure which constitutes an essential element of the cost price.

Once washed with clear water, the grains are drained or centrifuged in draining hoppers or basins and are ready for any required uses; for instance, the pure coal can be used for the production of coke for making electrodes, and the residual coal can be put to any use indicated by its nature and analysis, is, for instance, metallurgical coke manufacturing or as pulverized fuel.

If examination of the raw coal shows that it contains a sufficient proportion of schists or slates and of streaked coal with a high ash content, the separator plant may be preceded, after or instead of de-sliming, by ordinary coal washing devices, such as piston troughs or vats, buddlers or the like. Any concentration device adapted to remove most of the waste products will decrease the tonnage to be passed through the dense liquid, increase the output capacity of the plant, and decrease the soluble salt losses which are proportional to the tonnage passed through the eparator.

Incidentally, the residual coals will be improved as to quality, and so will the products for which they serve as raw material.

I claim as my invention:

1. A process of preparing coals for separation according to specific gravity, comprising the steps of wetting the coal with water; then subjecting the coal to a plurality of successive impregnating treatments with liquids of increasing densities; draining the coal between successive impregnations; and then subjecting the coal to the action of a separating liquid of the same kind as the impregnating liquids and having a density appropriate to the separation to be effected, the last impregnating liquid used having a density approaching as closely as possible that of said separating liquid.

2. A process of preparing coals for separation according to specific gravity, comprising the steps of wetting the coal with water; then subjecting the coal to a plurality of successive impregnating treatments with liquids of increasing densities; draining the liquids separately from the coal after the impregnating treatments; subjecting the coal to the action of a separating liquid of the same kind as the impregnating liquids and having a density appropriate to the separation to be effected, the last impregnating liquid used having a density approaching as closely as possible that of said separating liquid; and washing the pure coal and the residues with the drain liquids, after the separating treatment, in decreasing order of their densities.

3. A process according to claim 2, in which each liquid travels through an independent closed cycle.

4. In a process of preparing coals for separation according to specific gravity, the step of circulating a series of liquids of different densities each through an independent closed cycle to act initially upon the coal under treatment to impregnate the same before separation, and subsequently to wash the coal after separation; said liquids becoming weakened during the impregnating treatment, and being restored during the washing treatment substantially to the original density essential to said impregnating treatment.

5. A process for separating coal of low ash content, consisting in crushing and screening the coal to small size; then wetting it with water; then subjecting it to a series of impregnating treatments with a series of liquids of increasing densities; and then separating it by a float-and-sink treatment according to specific gravity in a liquid of the same kind as the impregnating liquids.

6. A process according to claim 5, in which the impregnating liquids used prior to the float-and-sink treatment are used separately in reverse order after said treatment to wash the coal.

In testimony whereof I affix my signature.

MAURICE BERTRAND.